Patented Apr. 21, 1953

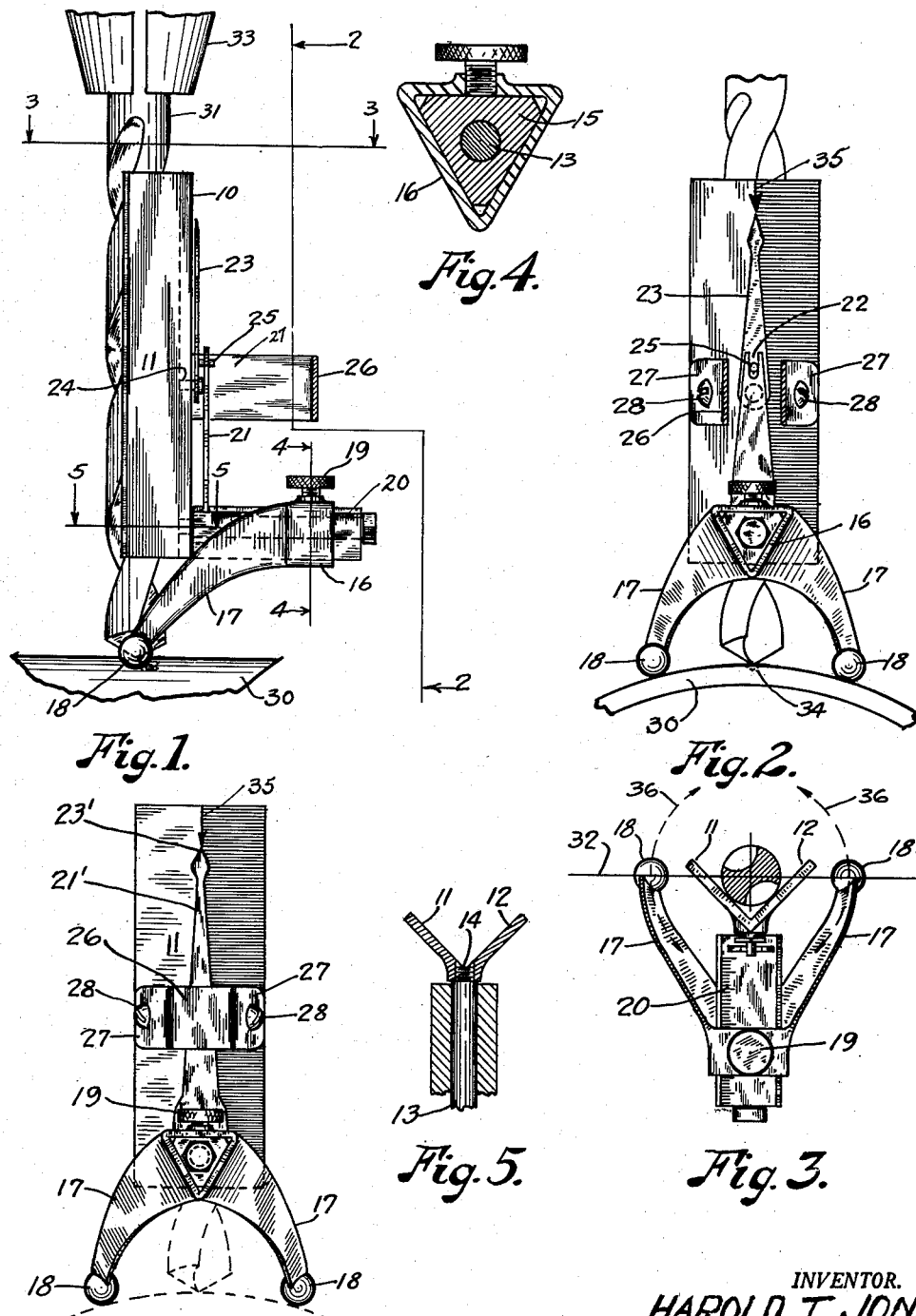

2,635,348

UNITED STATES PATENT OFFICE 2,635,348

DRILL ALIGNING GAUGE

Harold T. Jones, Vallejo, Calif.

Application January 17, 1949, Serial No. 71,256

5 Claims. (Cl. 33—185)

This invention relates to gauges and more particularly to a gauge for centering a drill to bore a hole normal to a circular surface.

In certain drilling operations, especially where the work is fixed and the drill must be oriented to a position to drill a hole normal to a curved surface, considerable difficulty has been experienced in properly orienting the drill. Thus, in ship building and other fabrication, parts of the structure are fixed in space and drilling must be achieved by certain portable tools which must be properly located relative to the work.

One of the principal objects of the invention is to provide a drill gauge with which a drill may be oriented relative to the work piece so that the drill will produce a hole normal to a curved surface.

Another object is to provide a drill gauge with which a drill may be oriented relative to a cylindrical work piece so that the drill will produce a hole radially thereof.

Another object is to provide a drill gauge with which orientation of the drill may be achieved while the drill is rotating.

Another object is to provide a drill gauge with which work may be oriented relative to a drill rotating on a fixed axis to produce a hole normal to a curved surface.

A further object is to provide a drill gauge which is simple in construction, extremely rugged, and which may be economically manufactured.

Still further objects, advantages, and salient features will become apparent from a consideration of the specification to follow, the appended claims, and the accompanying drawing in which:

Figure 1 is a side elevation of the drill gauge, a portion thereof being broken away;

Figure 2 is a side elevation, partly in section, taken on line 2—2, Figure 1;

Figure 3 is a top plan, partly in section taken on line 3—3, Figure 1;

Figure 4 is a section taken on line 4—4, Figure 1;

Figure 5 is a section taken on line 5—5, Figure 1; and

Figure 6 is a side elevation similar to Figure 2 showing a slightly modified construction.

Referring in detail to the drawing, a metal section 10 having side walls 11, 12, supports a circular pin 13 near its lower end, this pin projecting at 90 degrees to the angle section and being secured thereto by end 14 which threadedly engages the walls at the intersection thereof so that the axis of the pin bisects the angle therebetween.

A triangular member 15 is rotatably supported on the pin and slidably supports a hub 16 having integral legs 17, the feet 18 of which are spherical. The hub may be fixed at various positions along member 15 and secured by thumbscrew 19. A scale 20 is provided on member 15, the purpose of which will be hereinafter set forth.

Member 15 carries an arm 21 on one end thereof which has a slot 22 at its upper end. A pointer 23 pivotally supported at 24, has a pin 25 projecting into this slot. This construction amplifies the movement of arm 21 relative to section 10 so that its movement is multiplied at the end of the pointer, thus rendering the instrument more sensitive. If this refinement is not desired, the construction is as shown in Figure 6 wherein arm 21' has the pointer 23' directly secured thereto. This construction has the advantage that it is more simplified and can thus be more economically manufactured, but lacks the sensitivity of the construction previously described.

A U-shaped member 26 having legs 27, 27, secured to section 10 by screws 28, 28, is disposed adjacent the upper end of arm 21. Legs 27, 27 form stops for movement of arm 21 therebetween and also serve as a finger grip for holding the device in operative position when in use.

The purpose of the various components of the gauge can best be understood by a description of the manner in which the gauge is used, which follows:

Referring to Figures 1 to 3, a cylindrical object or work piece 30 is shown which may be assumed to be in any fixed position in space into which it is desired to drill a hole normal to its surface, that is, radially. After the size of the drill 31 has been selected, member 16 is adjusted along scale 20 to the corresponding size of the drill, this scale being so calibrated that a straight line 32, passes through the axis of the drill and the centers of the spherical feet 18. The drill is secured in a suitable chuck 33 which may be adjusted to various positions relative to the work piece 30. The tip of the drill is placed in a center punch depression 34 with the axis of the drill generally normal to the work piece. The V section 10 is then placed against the drill with the feet 18 lying in a plane substantially transverse of the cylindrical work piece. The drill chuck is then moved in this same plane which moves V section 10 until pointer 23 is in alignment with arrow 35. The axis of the drill will now intersect the axis of the cylindrical work piece but this axis is not necessarily perpendicular thereto. To achieve the latter, the gauge is rotated to a different position on the work piece as indicated by the dotted lines 36, Figure 3. At a new position the drill is adjusted in a plane which intersects the axis of the work piece until the pointer again coincides with arrow 35. The axis of the drill is now disposed radially of the cylindrical work piece and retaining the chuck in such position of orientation the hole is then drilled.

With the feet 18 adjusted in alignment with the drill, as just described, it is not necessary to rotate the gauge to two positions 90 degrees apart, a relatively small amount of movement being sufficient. The gauge, however, will still be operable with the feet 18 displaced laterally of the axis. Thus, if it be desired to dispense with the refinement of the adjustable feet and scale, the feet may be placed in a fixed position relative to member 15. As the size of the drill varies, the displacement of the feet relative to the axis of the drill will also vary. With this construction it would therefore be necessary to apply the gauge to the drill at two different positions 90 degrees apart to obtain proper adjustment. While greater movement of the gauge is necessary with fixed feed, it has the advantage of being somewhat simplified.

Another example of the use of the device is in drilling holes in cylindrical work pieces on a machine which has a fixed spindle and table, such as a drill press. A cylindrical rod, for example, is supported on one or more V blocks and the gauge applied as before. When the work piece is shifted laterally or rotated on the V blocks until the pointer and arrow remain in alignment for two positions of the gauge, as previously described, the axis of the drill will then be disposed radially of the work and a hole may be drilled which is exactly central of opposed sides of the work piece. Previous constructions for performing this operation have been more cumbersome in that they required making accurate measurements to properly locate the drill, or cumbersome jigs, which employed expensive drill bushings or the like.

In the mode of operation previously described, it was assumed that the drill was stationary while the adjustments were being made. This is not necessary and the adjustments may be made while the drill is rotating since the inside walls of section 10 provide ample bearing surface for engaging the flutes of the drill without wear to the drill or gauge.

While the use of the gauge has been described in connection with a drilling operation, it is apparent that it has other uses. If, for example, it were desired to weld two cylindrical members together with their axes intersecting and perpendicular, one of the members would be in the same position as the drill and the gauge operated as before described. Moving the gauge around such cylindrical member and orienting it until the pointer remains at its central position will place the two members in the desired position, after which they may be welded.

From the foregoing it becomes apparent that many uses may be found for the gauge and the particular uses described are for purpose of exemplification, rather than limitation. It is also apparent that many modifications may also be made without departing from the spirit of the invention and it is therefore not desired to limit the invention to the precise construction disclosed, except as limited by the appended claims.

Having described the invention what is claimed as new is:

1. A gauge device for positioning a first cylindrical member with its axis perpendicular to the axis of a second larger cylindrical member, comprising in combination an elongated channel member having a V-groove for the reception of the first cylindrical member to dispose its axis parallel with the sides of the groove, a second member having two spaced feet terminating in contact points adapted to engage the outer surface of the second cylindrical member at spaced points in a plane perpendicular to the axis thereof, means for attaching said second member to the channel member for rocking movement, comprising a pivot pin projecting laterally from near one end of said channel member, the axis of the pin lying in the plane bisecting the angle between the sides of the V-groove and perpendicular to the line of intersection of the sides, the feet of the second member lying in a plane perpendicular to the axis of the pivot pin, and means comprising a pointer carried by the said second member and movable therewith with respect to an indicia point on the channel member for indicating when the axes of the two cylindrical members are perpendicular to each other.

2. A gauge comprising; an elongated V-shaped member, a pivot pin extending laterally of said member adjacent one end thereof, the axis of the pin being substantially perpendicular to a line formed by the intersection of the sides of the V-shaped member and in a plane that bisects the angle formed by said sides, a second member journaled on the pin, a pair of legs slideably mounted along the last named member having feet extending laterally of the V-shaped member on opposite sides thereof and provided with contact points thereon adapted to engage a cylindrical member at circumferential points thereon, and indicating means having a portion fixed to said second member and extending toward the other end of the V-shaped member responsive to relative rotation of the V-shaped member and second member for indicating when a line drawn through said circumferential points is perpendicular to a longitudinal axis parallel to and equidistant from the sides of the V-shaped member.

3. A gauge in accordance with claim 2 wherein the last named means includes a pointer pivoted to the V-shaped member and an arm secured to said second member, the arm and pointer being so interconnected that motion of the arm is multiplied on the pointer.

4. A gauge in accordance with claim 2 wherein the last named means includes a pointer secured to said second member.

5. A gauge device for use in positioning the axis of a cylindrical member with respect to a second member having a convexly curved outer surface so that the axis of the cylindrical member will intersect the center of curvature of said second member, comprising an elongated channel member having a V-groove for the reception of the cylindrical member, a third member having a pair of spaced feet whose ends form points for engaging the surface of said second member, means rockably connecting the said third member and the channel member comprising a pivot pin projecting laterally from the channel member on the side opposite from the channel, the axis of the pin being coincident with a plane bisecting the angle between the sides of the V-groove and perpendicular to the line of intersection of said sides, the spaced feet lying in a plane perpendicular to the axis of said pivot pin, and means comprising an arm carried by said third member and a cooperating pointer carried by the channel member, interconnected for simultaneous movement with respect to the channel member, for indicating the relative angular relation between said second member and the channel member.

HAROLD T. JONES.

References Cited in the file of this patent

UNITED STATES PATENTS

| Number | Name | Date |
|---|---|---|
| 550,061 | Simpson | Nov. 19, 1895 |
| 698,554 | Reynolds | Apr. 29, 1902 |
| 806,682 | Kurt | Dec. 5, 1905 |
| 1,249,584 | Wycislo | Dec. 11, 1917 |
| 1,678,761 | Bernhardt et al. | July 31, 1928 |
| 1,883,197 | West | Oct. 18, 1932 |
| 2,360,421 | Hohmann | Oct. 17, 1944 |
| 2,468,395 | Fredin | Apr. 26, 1949 |
| 2,483,060 | Niedelman et al. | Sept. 27, 1949 |